G. VAN ANTWERP.
MOTOR WHEEL FOR CYCLES.
APPLICATION FILED OCT. 24, 1916.
1,247,752.
Patented Nov. 27, 1917.
6 SHEETS—SHEET 5.
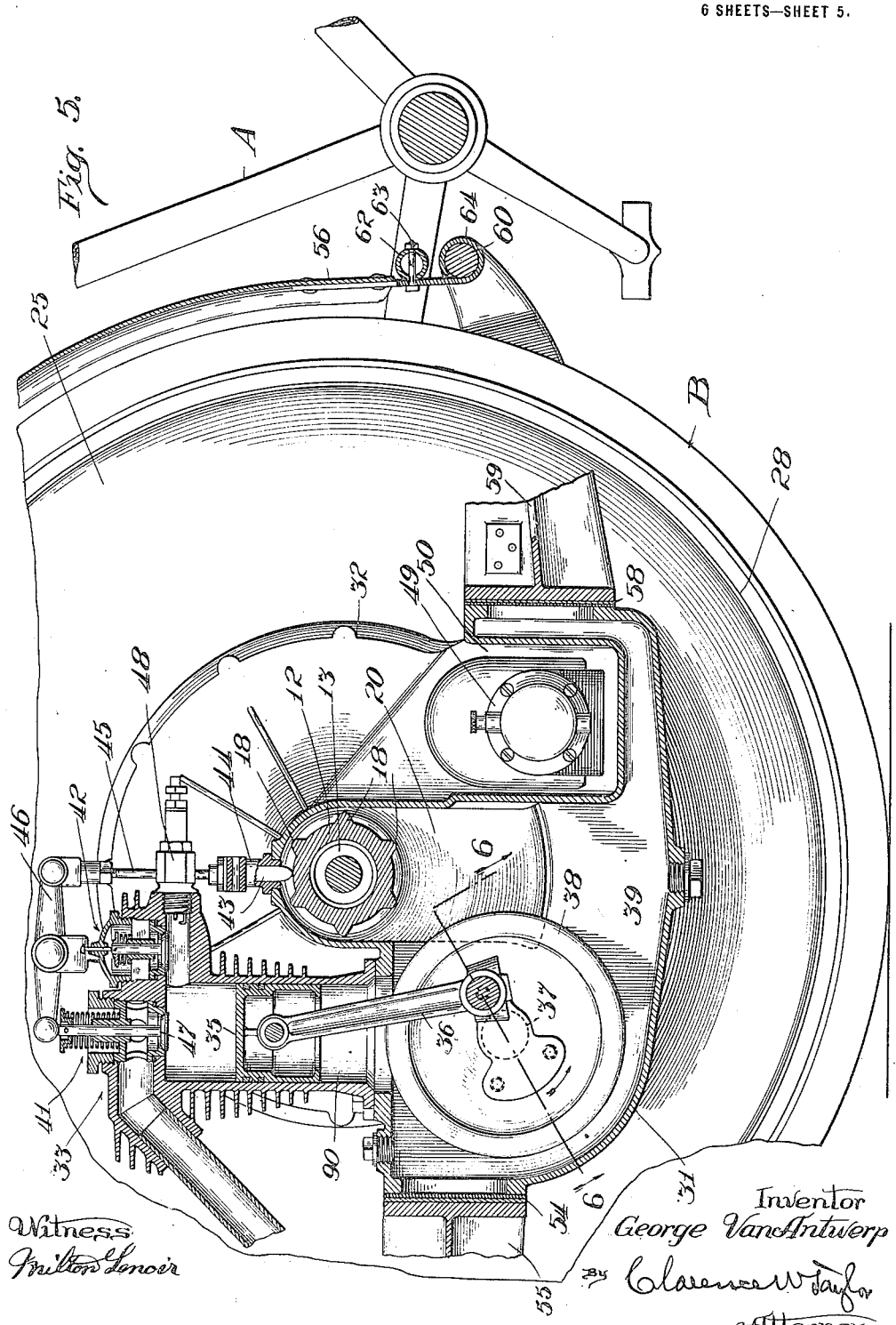

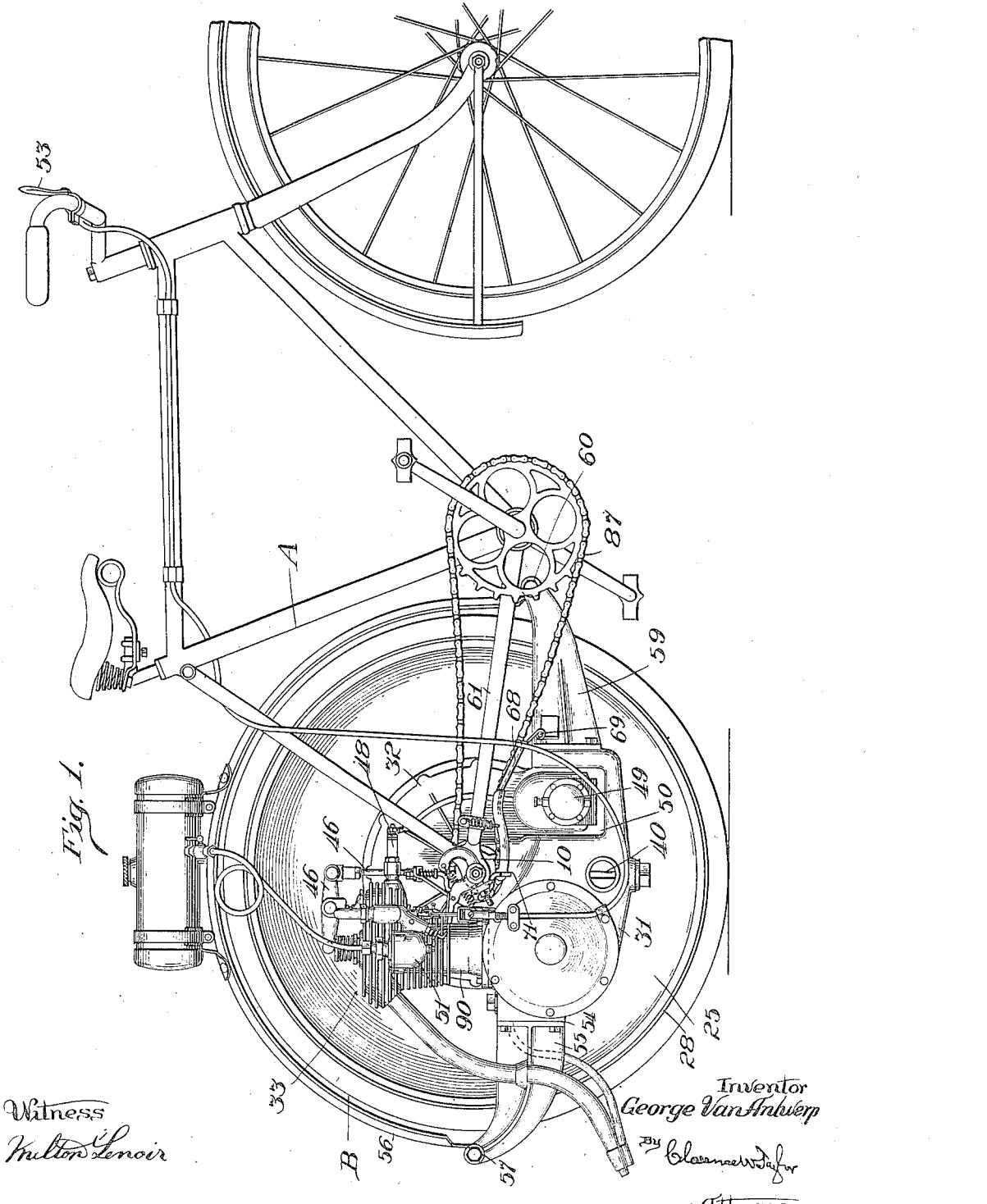

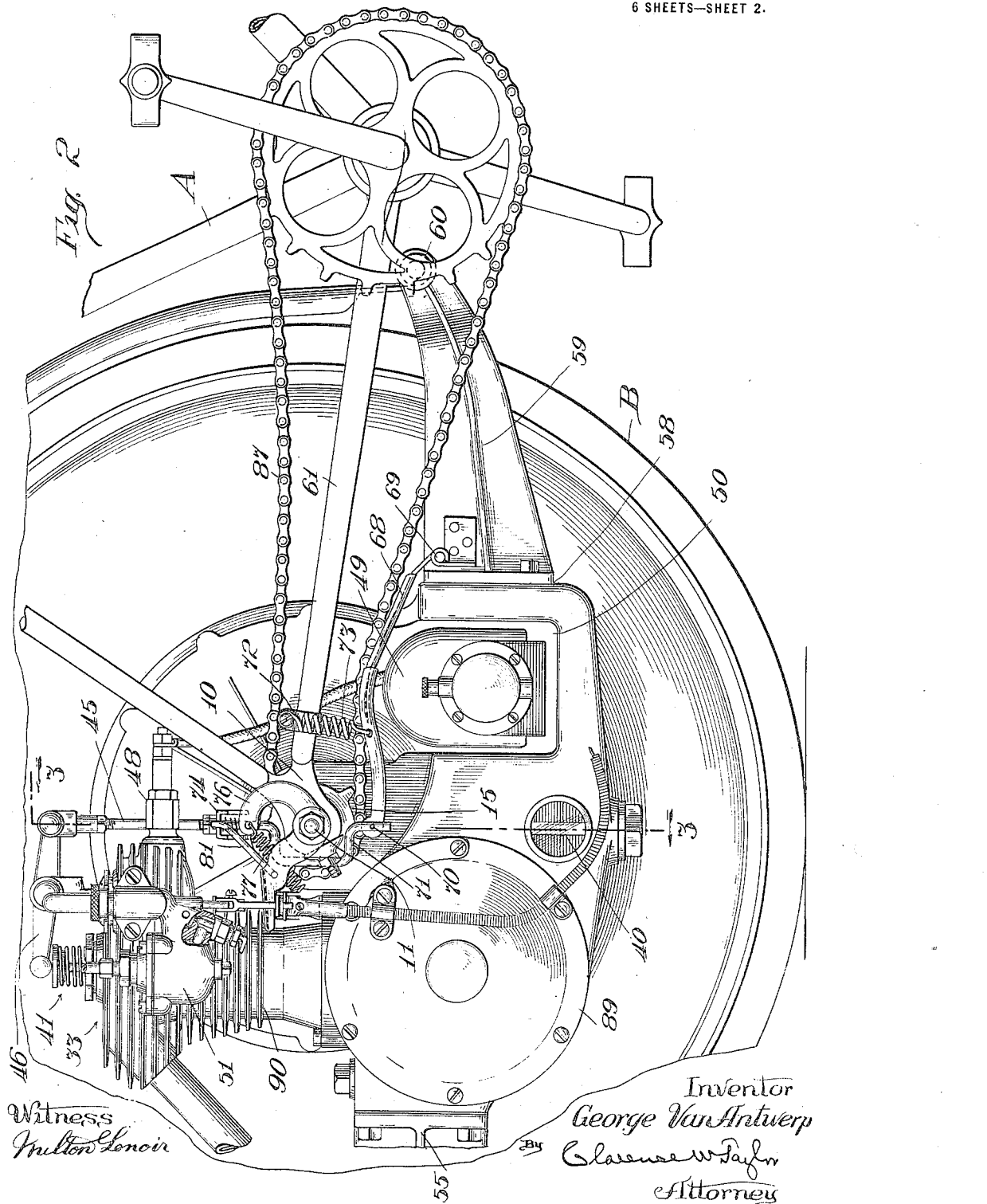

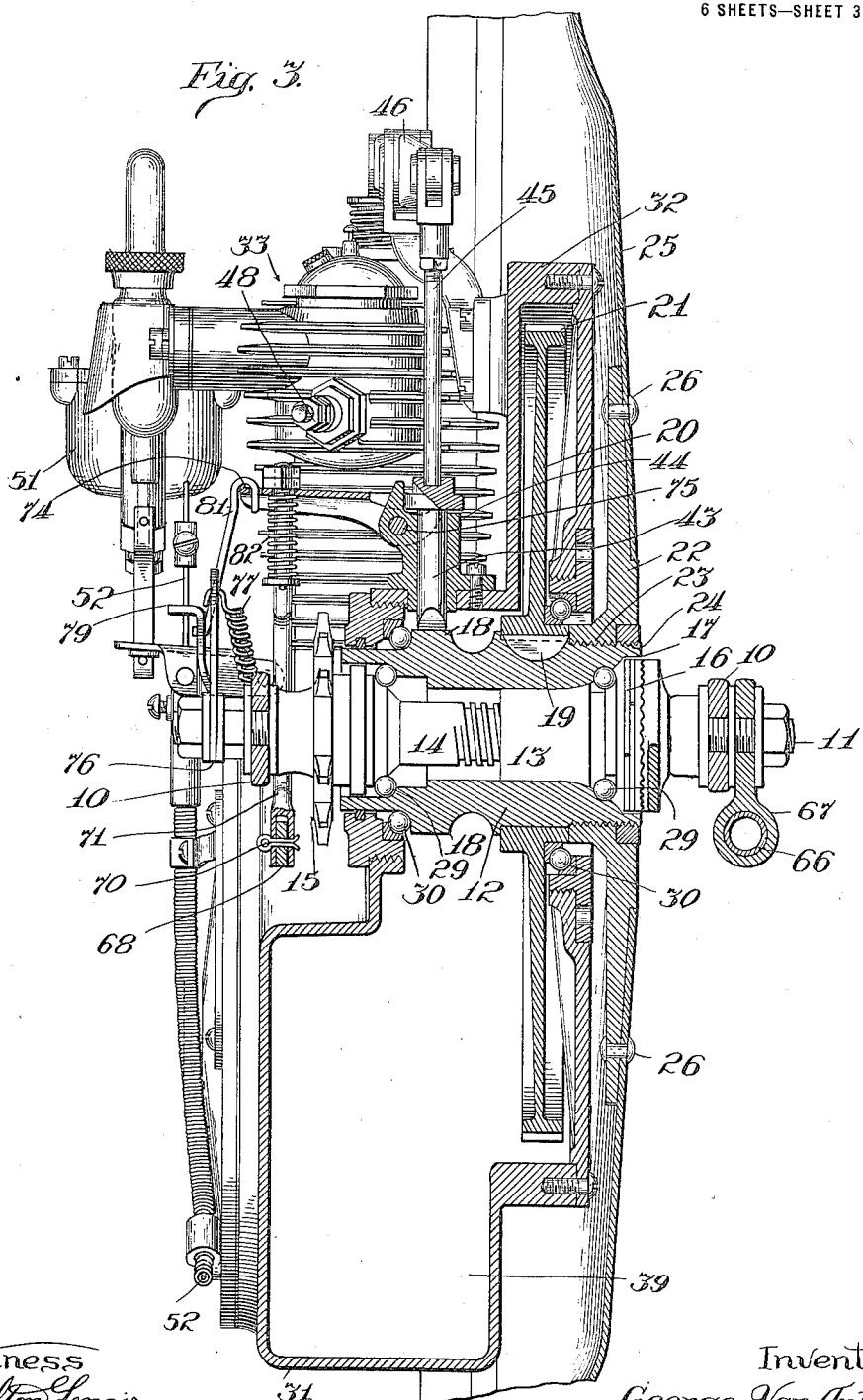

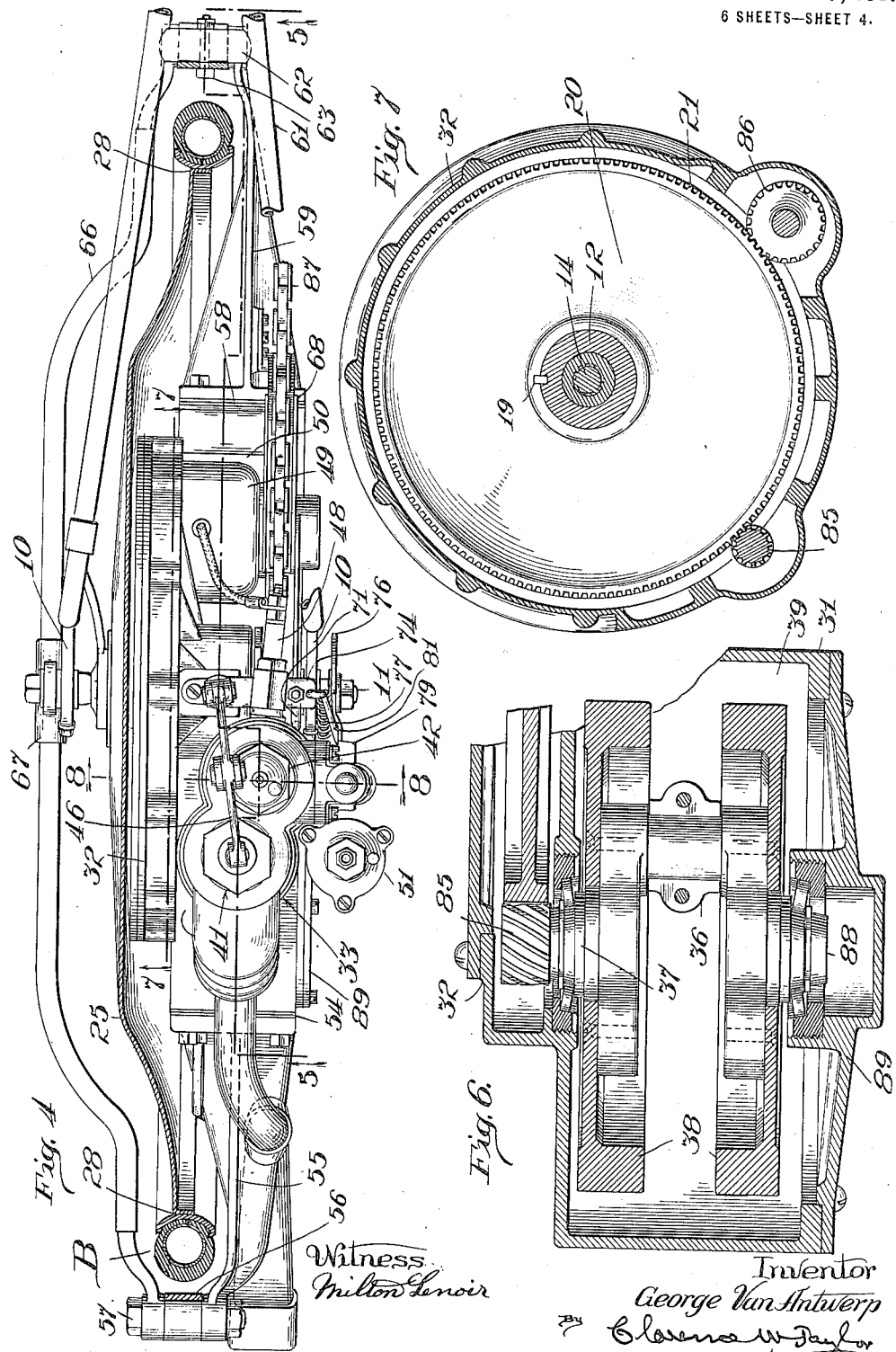

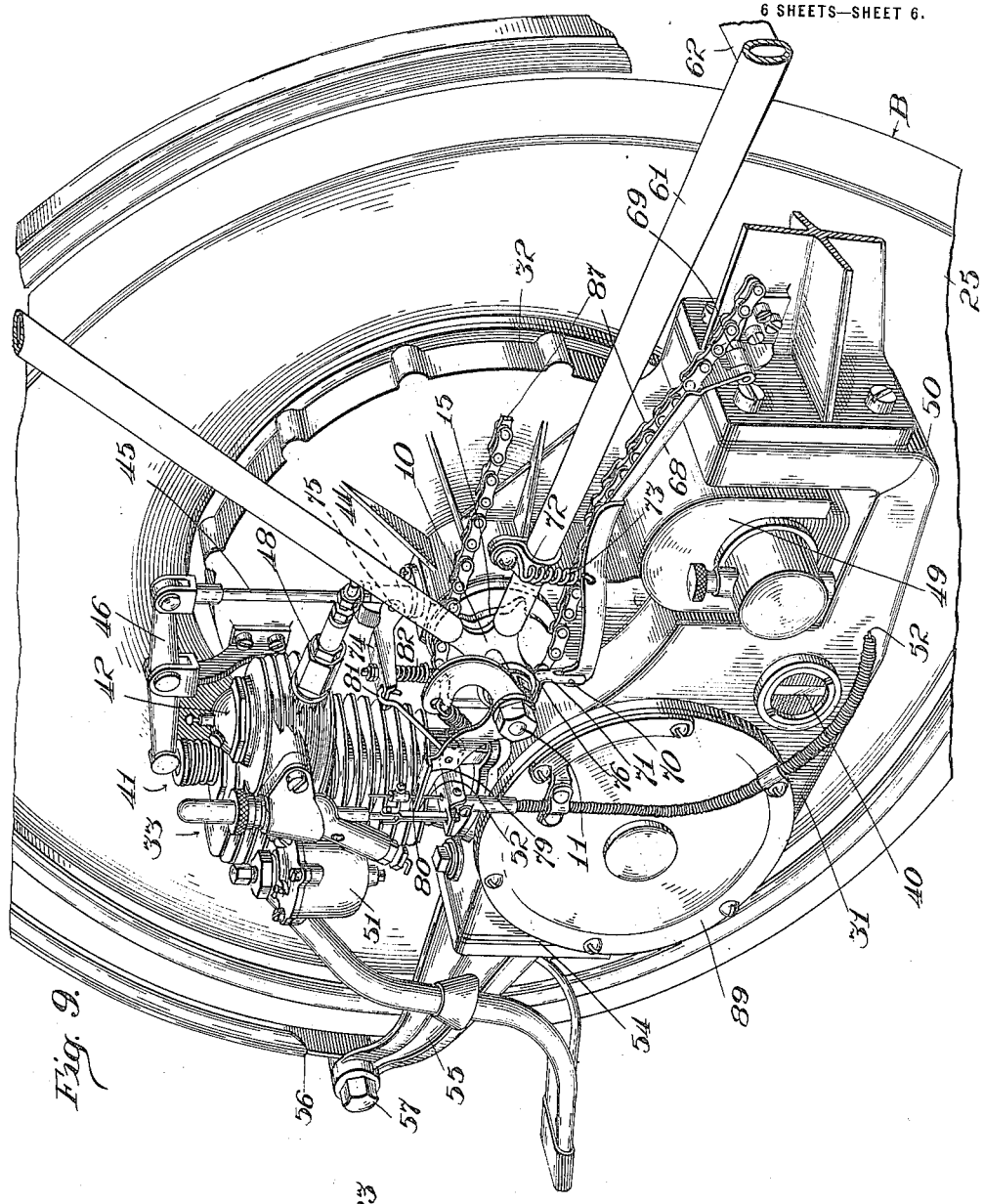

UNITED STATES PATENT OFFICE.

GEORGE VAN ANTWERP, OF GRAND RAPIDS, MICHIGAN, ASSIGNOR TO POWER WHEEL MANUFACTURING COMPANY, OF CHICAGO, ILLINOIS, A CORPORATION OF ILLINOIS.

MOTOR-WHEEL FOR CYCLES.

1,247,752.　　　　Specification of Letters Patent.　　Patented Nov. 27, 1917.

Application filed October 24, 1916. Serial No. 127,345.

*To all whom it may concern:*

Be it known that I, GEORGE VAN ANTWERP, a citizen of the United States of America, residing at Grand Rapids, in the county of Kent and State of Michigan, have invented certain new and useful Improvements in Motor-Wheels for Cycles, of which the following is a specification.

My invention relates to improvements in motor wheels for cycles; and the objects of my improvement are, first, to construct a power plant within a driving wheel to replace the rear wheel of any standard bi-cycle frame and to provide a fixed support for both ends of the wheel axle which extends from both sides of the driving wheel; second, to afford a driving wheel and motor and equipment suitably constructed to allow the rear forks of a standard bi-cycle frame to span the wheel and motor; third, to support the engine and its equipment on the hub of the driving wheel; fourth, the provision of a crank case and housing to inclose all moving parts and bearings for automatic oil distribution when the driving wheel is in operation; and, fifth, to produce automatic compression release devices associated with the bi-cycle chain to suddenly stop the bi-cycle and its motive power.

With above and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims, may be resorted to without departing from the spirit or sacrificing any of the advantages thereof.

In the drawings, the Figure 1 is a side elevation of my invention applied to a rear end of a bi-cycle frame of standard manufacture.

Fig. 2 is an enlarged elevational view of my driving wheel with parts broken away.

Fig. 3 is a vertical section on line 3 . . . 3 on Fig. 2.

Fig. 4 is a plan view of the engine and mechanism with the driving wheel in section.

Fig. 5 is a longitudinal section on line 5 . . . 5 on Fig. 4.

Fig. 6 is a detail cross section of the crank shaft on line 6 . . . 6 on Fig. 5.

Fig. 7 is a sectional view on line 7 . . . 7 on Fig. 4 disclosing the gears.

Fig. 8 is a detail cross sectional view on line 8 . . . 8 on Fig. 4, showing the intake valve and portion of the carbureter.

Fig. 9 is a perspective of the engine, driving wheel and compression-release.

Similar numerals and letters refer to similar parts throughout the several views.

In the construction chosen to illustrate my present invention the letter A designates a bi-cycle frame of standard manufacture with my driving wheel B inserted in the rear forks 10 of the bi-cycle or vehicle frame.

Beginning with the axle 11 which extends on both sides of the driving wheel and is fastened at both ends to the rear forks 10 of the bi-cycle frame, I employ the standard axle and coaster brake, excepting the hub shell of the coaster brake, which I replace with a hub shell 12 of my own design having the same conical interior surface of the original hub shell of the coaster brake, but exteriorly formed to carry and operate the engine and its equipment. The bi-cycle axle and coaster brake parts, the clutch proper, 13, the screw 14, with the sprocket 15, and the brake plates 16 and the adjacent brake surface 17, are of well known construction.

Beginning with the exterior of the hub shell, 12, there is formed an annular series of six cams or lifts 18, in uniform spaced relation to each other to afford proper timing of a gear ratio of 12 to 1 to give the required speed for a bi-cycle of this type, being from 1 to 25 miles per hour.

Upon the exterior of the hub shell 12 is keyed at 19 the large gear wheel 20 with its spirally disposed gear teeth 21.

Near the outer end of the hub shell 12 is a cast disk 22 provided with a female thread 23 for engagement with the male thread 24 of the hub shell 12.

The dished portion 25 is made of sheet metal and secured to the cast disk 22 at 26 in any suitable or preferred manner, and at its outer periphery 27 welded to the tire rim 28.

On reference to Fig. 3 it will appear that the balls 29 support the rider and the frame, and that the balls 30 support the engine and its equipment.

The crank case 31 and the gear housing 32 are supported on the hub 12 of the dished wheel, at 30, the axle and coaster brake are independent of the motor or wheel.

The motor 33, is supported on the crank case 31 at 34. The piston head 35, connected with rod 36, is operatively engaged with the crank shaft 37, which is journaled in the crank case, as shown in Fig. 6 of the drawings. The fly wheels, 38, which are in the oil reservoir, 39, serve to distribute oil from their peripheries by centrifugal force when the motor is running. There are inclosed all bearings, coaster brake wheel, hub, cams, lower end of tappet rod, axle and gears in mesh within the crank case and gear housing so that all parts requiring oil are supplied from the oil reservoir by the action of the fly wheels when the motor is in operation. The crank case is formed with a transparent window 40 to ascertain the amount of oil supply.

The valves 41 and 42 are respectively the exhaust and intake valves in the head of the usual form. The intake valve is automatically operated by suction of the piston on the the intake stroke. The valve is provided with a spring with sufficient tension to close the valve at the extreme length of the piston stroke.

The valve 41 is mechanically operated from the integral cams 18 on the hub of the wheel by means of a tappet rod 43 through the tappet guide 44 and push rod 45 to the rocker arm 46 to the top of the valve stem 47 of the exhaust valve.

The spark plug 48 is inserted in the housing of the intake valve.

A standard magneto, 49, is mounted in a recess 50 outside of the crank case at one end of which the magneto shaft extends through the crank case permitting the magneto gear to reach and mesh with the large driving gear, 20.

The magneto is set at the proper degree to give the spark at the proper time for all speeds from 1 to 25 miles per hour, thus rendering unnecessary a spark advance lever.

The carbureter 51 is the ordinary cup float type, with needle adjustment, with plunger throttle, connected direct with the housing of the automatic intake valve. It has ordinary wire control 52 from the handle bar consisting of one thumb lever 53.

At the rear end of the crank case at 54 is suitably bolted an arm 55 which is secured to the rear end of the fender 56 at 57. At the front end of the crank case at 58 is similarly bolted an arm 59 to the forward end of the fender 56 at 60.

The lower side tubes 61 of the bi-cycle frame has a short tube 62 with its ends brazed or otherwise fastened to the side tubes 61. The forward lower end of the fender is bolted at 60 to the short tube 62, and an extension 64 affords anchorage for the bolt 60 through the front end of the arm 59 and the rod 66 which is secured to the hanger 67.

For the purpose of providing means to release compression automatically by back pedaling and to set the coaster brake members, I have constructed what is termed a track or chain-way 68 of sheet metal, preferably formed in two pieces, one end of the forward piece being hinged at 69 to the front end of the crank case, and the rear end of the other section of the chain-way, 68, being pivoted at 70 to the link 71. Attached to the side tube 61 is a bracket 72 with an extension coil spring 73 having its free end in engagement with the rear section of the chainway 68. The link 71 is at its upper end slidably attached to lever 74 which is pivoted on tappet guide 44 at 75, and has the short end of the lever in engagement with the tappet rod 43 which operates the rocker arm 46 to the top of the valve stem 47 of the exhaust valve 41.

Increasing the tension of the bi-cycle chain by back pedaling raises the valve tappet and opens the exhaust valve thus releasing the compression and prevents any further compression or explosion. Also this prevents applying the brakes while the motor is developing power. The function of the spring 73 is to immediately close the exhaust valve on releasing the brakes, and permits the motor to resume the development of power for rotation of the road wheel.

The member 76 is pivoted on the axle 11, and is formed with two arms, one of which has a resilient element 77 attached thereto, the other end anchored to a bolt head at 78, and the other arm has a flange 79 slotted at 80 to receive one end of the wire control 52.

The link 81 connects the lever 74 and the flanged arm of the member 76.

On the upper end of the link 71, is a cushion spring 82.

On releasing the compression the operator can easily start the motor by pedaling the driving wheel, as he opens the fuel valve 83 on the carbureter when he starts his motor.

Preferably the driving wheel is provided with a steel clencher 28 in rim suitable to take any standard 28 inch one and a half to one and three quarters inch clencher bi-cycle tire available at any bi-cycle shop.

My engine-valve-operating-cams, 18, preferably are integral with the hub-shell, 12, of the coaster brake.

My axle is a part of the original bi-cycle. I use the standard axle and coaster brake, excepting the hub-shell is constructed externally to become a part of my driving wheel.

My axle is supported at both ends by the rear forks of the standard bi-cycle frame, and has to support only the weight of the bi-cycle frame and its rider, the motor being supported independent of the axle and on the hub of the driving wheel, all of the weight of the motor and its equipment being placed on the driving wheel and not on the axle.

On referring to Figs. 6 and 7, of the drawings, it will be noticed the end of the crank shaft 37 is formed with gear, 85, and that it and magneto gear 86 are in mesh with the large gear wheel 20. That the chain 87 is operatively connected with the sprocket 15, which is fixed to the coaster brake.

The outer fly wheel carries a shaft 88 which is journaled in the removable cap 89.

When it is desired to employ my wheel and its power plant in the place of the rear bi-cycle wheel it is only necessary to remove the rear bi-cycle wheel and install my driving wheel in the rear forks of the bi-cycle or vehicle frame, as indicated by the drawings, when a complete motor cycle is available.

It will be noted the motor is supported independent of the axle on the hub of the driving wheel.

The means on the hub-shell for producing periodic operation of the valve 41 is lubricated by oil distributed from the peripheries of the fly wheels within the crank case.

The crank case is directly supported on the hub-shell and the cylinder 90 of the motor, and its equipment is supported on the crank case.

Having thus finally described my invention, what I claim as new, and desire to secure by Letters-Patent, is:

1. In a device of the class described, the combination of a driving wheel, a bi-cycle frame, an axle and a coaster brake including hub-shell, the axle extending both sides of the driving wheel and being fixed at both ends to the rear forks of the bi-cycle frame, a motor supported independent of the axle on the hub of the driving wheel, a motor valve operating cam upon said hub, a crank shaft for the motor and means for operatively connecting the crank shaft and the hub of the driving wheel.

2. In a device of the class described, the combination of a driving wheel, an axle and a coaster brake including a hub-shell, a motor mounted on said hub-shell, the motor having a valve communicating with the motor cylinder and a crank shaft, means on said hub-shell for producing periodic operation of said valve, and means for connecting said hub-shell and the crank shaft.

3. In a device of the class described, the combination of a driving wheel, a bi-cycle frame, an axle and a coaster brake including a hub-shell, the axle extending both sides of the driving wheel and being fixed at both ends to the rear forks of the bi-cycle frame, a motor supported independent of the axle on the hub of the driving wheel, a motor valve operating cam upon said hub, a crank shaft for the motor, means for operatively connecting the crank shaft and the hub of the driving wheel, and means for connecting the motor frame with the bi-cycle frame.

4. In a device of the class described, the combination of a driving wheel, an axle and coaster brake including a hub-shell fixed to the driving wheel, a motor mounted on the shell of the coaster brake and suitably arranged on the driving wheel independent of the axle, and means for operating the coaster brake.

5. In a device of the class described, the combination of a driving wheel, a bi-cycle frame, an axle and a coaster brake including a hub-shell fixed to the driving wheel, a motor mounted on the shell of the coaster brake and suitably arranged on the driving wheel independent of the axle, and means for operating the coaster brake.

6. In a device of the class described, the combination of a driving wheel, a bi-cycle frame, an axle and a coaster brake including a hub-shell fixed to the driving wheel, the axle extending both sides of the driving wheel and being fixed at both ends to the rear forks of the bi-cycle frame, a motor mounted on the shell of the coaster brake and suitably arranged on the driving wheel independent of the axle, and means for operating the coaster brake.

7. In a device of the class described, the combination with a driving wheel having an axle and a coaster brake including a hub-shell fixed to the driving wheel of a motor supported independent of the axle on the hub-shell of the driving wheel, a motor valve operating cam upon said hub-shell, a crank shaft for the motor, the motor having a valve communicating with the motor cylinder and a crank shaft, and means for connecting said hub-shell and the crank shaft.

8. In a device of the class described, the combination of a driving wheel, an axle and a coaster brake including a hub-shell fixed to the driving wheel, the axle extending both sides of the driving wheel, a crank case supported independent of the axle on the hub-shell of the driving wheel, a motor mounted and suitably arranged on the crank case, and a fender supported by the crank case.

9. In a device of the class described, the combination of a driving wheel, an axle and a coaster brake including a hub-shell fixed to the driving wheel, a crank case supported independent of the axle on the hub-shell of the driving wheel, a motor supported on the crank case and having a valve communicating with the motor cylinder and a crank shaft, means carried by said hub-shell for producing periodic operation of said valve and means for connecting said hub-shell and the crank shaft.

10. In a device of the class described, the combination of a driving wheel, a vehicle frame, an axle and a coaster brake including a hub-shell fixed to the driving wheel, the axle extending both sides of the driving wheel and being fixed at both ends to the vehicle frame, a crank case supported independent of the axle on the hub-shell of the driving wheel, a motor mounted and suitably arranged on the crank case, means for operating the coaster brake and means for connecting the crank case with the vehicle frame.

11. In a device of the class described, the combination of a driving wheel, a vehicle frame, an axle and a coaster brake including a hub-shell fixed to the driving wheel, the axle extending both sides of the driving wheel and being fixed at both ends to the vehicle frame, a crank case supported independent of the axle on the hub-shell of the driving wheel, a motor mounted and suitably arranged on the crank case, means for operating the coaster brake, means for connecting the crank case with the vehicle frame, and auxiliary means for releasing compression in the motor cylinder.

12. In a device of the class described, the combination of a driving wheel, a vehicle frame, an axle and a coaster brake including a hub-shell fixed to the driving wheel, the axle extending both sides of the driving wheel and being fixed at both ends to the vehicle frame, a crank case supported independent of the axle on the hub-shell of the driving wheel, a motor mounted and suitably arranged on the crank case, means for operating the coaster brake, means for connecting the crank case with the vehicle frame, compression releasing means and pedal operated means to actuate the compression releasing means.

In testimony whereof I affix my signature in the presence of a witness.

GEORGE VAN ANTWERP.

Witness:
　Scott M. Hogan.